Fig. 2

| Kb | M | F | a P1 P3 1/2 5/6 | | b P1 P3 1/4 5/8 | | c P2 P4 3/8 7/6 | | d P2 P4 3/2 7/6 | | e P1 P3 8/1 4/5 | | f P1 P3 6/1 2/5 | | g P2 P4 6/3 2/7 | | h P2 P4 4/3 8/7 | |
|---|---|---|---|---|---|---|---|---|---|---|---|---|---|---|---|---|---|---|
| $I_1/I_2{}^+_-$ | | 2 | | | | | | | | | | | | | | | | |
| $I_1/I{}^+_-$ | | 2 | | | | | | | | | | | | | | | | |
| $I_2/I{}^+_-$ | 90 | 2 | 180 | | 180 | | | 180 | | 180 | | 180 | | 180 | | 180 | | 180 |
| $II_1/II_2{}^+_-$ | | 2 | | | | | | | | | | | | | | | | |
| $II_1/II{}^+_-$ | | 2 | | | | | | | | | | | | | | | | |
| $II_2/II{}^+_-$ | | 2 | | | | | | | | | | | | | | | | |
| $I/II{}^+_-$ | 40 | 1 | 40 | 40 | | | 40 | 40 | | | | | 40 | 40 | | | 40 | 40 |
| $I_1/II{}^+_-$ | | 2 | | | | | | | | | | | | | | | | |
| $I_2/II{}^+_-$ | 30 | 2 | | 60 | 60 | | 60 | | 60 | | 60 | 60 | | | 60 | 60 | | |
| $II_1/I{}^+_-$ | | 2 | | | | | | | | | | | | | | | | |
| $II_2/I{}^+_-$ | | 2 | | | | | | | | | | | | | | | | |
| $I_1/II_1{}^+_-$ | | 2 | | | | | | | | | | | | | | | | |
| $I_1/II_2{}^+_-$ | | 2 | | | | | | | | | | | | | | | | |
| $I_2/II_1{}^+_-$ | | 2 | | | | | | | | | | | | | | | | |
| $I_2/II_2{}^+_-$ | | 2 | | | | | | | | | | | | | | | | |
| | | S | 220 | 100 | 240 | - | 100 | 220 | - | 240 | - | 240 | 100 | 220 | - | 240 | 100 | 220 |
| | | V | 22 | 10 | 24 | 0 | 10 | 22 | 0 | 24 | 0 | 24 | 10 | 22 | 0 | 24 | 10 | 22 |

Inventors.
Georg Demmel,
Josef Becicka, &
Günter Schaenke

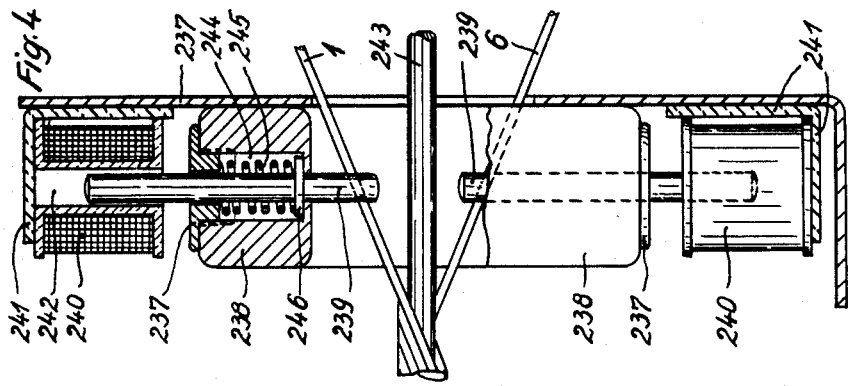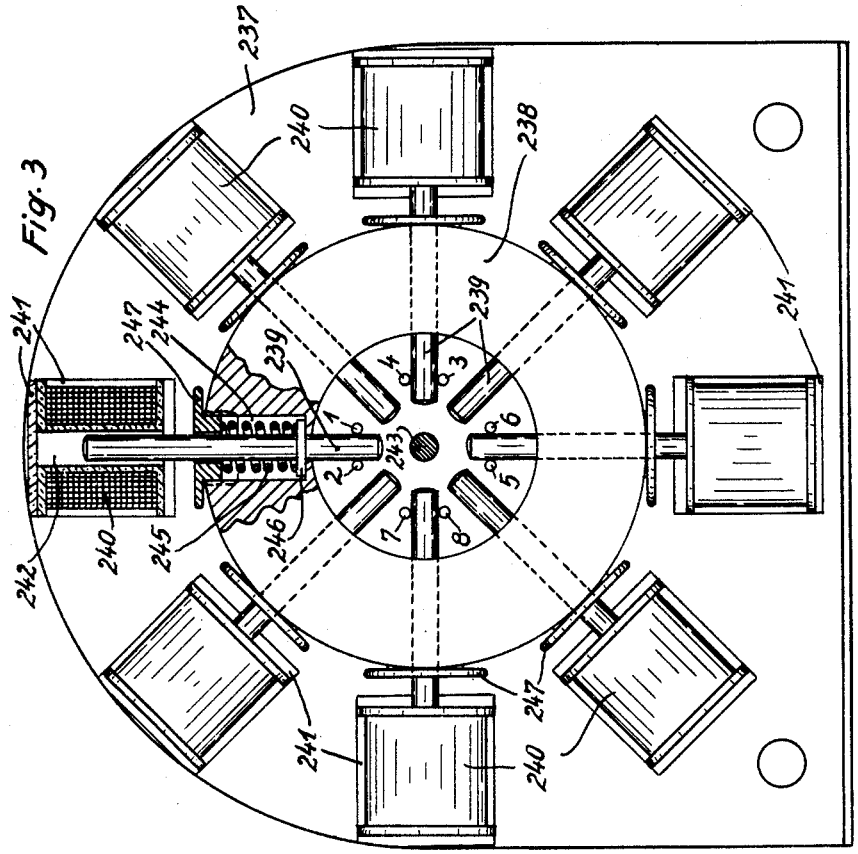

United States Patent Office 3,194,873
Patented July 13, 1965

3,194,873
COMMUNICATION CABLE HAVING SYSTEMATICALLY CROSSED INDIVIDUAL CONDUCTORS FORMING TWO-CONDUCTOR LINES
Georg Demmel and Josef Becicka, Berlin-Siemensstadt, and Günter Schaenke, Berlin-Friedenau, Germany, assignors to Siemens & Halske Aktiengesellschaft, Berlin, and Munich, a corporation of Germany
Filed Jan. 30, 1962, Ser. No. 169,920
Claims priority, application Germany, Feb. 17, 1961, S 72,578
1 Claim. (Cl. 174—34)

The invention disclosed herein is concerned with a communication cable having, arranged in layers, individual conductors from which are formed two-conductor lines by systematically mutually crossing individual conductors. The invention may be considered an improvement on the structure disclosed in copending application Serial No. 818,083, filed June 4, 1959, now abandoned, which is owned by the assignee named in the present case.

The copending application proposes to mutually cross, within a fabricated cable length of a cable, in given relatively short intervals, conductors which are not part of a two-conductor line, the crossing being thereby carried out between conductors which are adjacent to a respective crossing point.

The present invention proceeds from the thought that the systematic crossings eliminate substantially only those couplings which result from the parallel disposal of the conductors. However, couplings may also be produced by influences resulting from the fabrication, for example, by irregular crossing sections produced due to slippage, etc. These couplings must be compensated or equalized by auxiliary means and measures.

The reasoning underlying the present invention led to the recognition of the fact that it is possible to eliminate any coupling between two random line circuits of a layer of individual conductors, by displacing the crossing points of these conductors, without producing thereby further couplings between the other lines. The coupling factor produced by the displacement of a crossing point depends upon the amount or length of the displacement path. The amount of the displacement can accordingly be determined by measuring the coupling, and it is therefore possible, in accordance with the invention, to construct a communication cable of the previously noted kind, so as to be substantially free of disturbing couplings, by longitudinally displacing individual crossing points with respect to the position thereof which is provided therefor by the crossing plan or scheme, by given amounts ascertained from coupling measurements.

There are within the scope of this inventive thought several possibilities for producing communication cables of this kind which are free or substantially free of couplings.

The simplest possibility resides in measuring the residual couplings at the finally twisted or stranded and crossed layer, ascertaining the required displacements of the crossing points, and thereupon effecting the displacement manually.

However, the crossing points can also be displaced during the fabrication of the cable lengths. This is accomplished by measuring the couplings in the cable forming machine, ascertaining the required displacement of the crossing points, and thereupon effecting the displacement of the crossing points by the ascertained amounts, from the position thereof in which they should be according to the crossing scheme.

The various objects and features of the invention will appear from the description which will be rendered below with reference to the accompanying drawings, applying to the production of a strand comprising eight individual conductors.

FIG. 2 represents a decoupling plan for all coupling possibilities that may occur within an eight conductor twist length;

Figure 5:
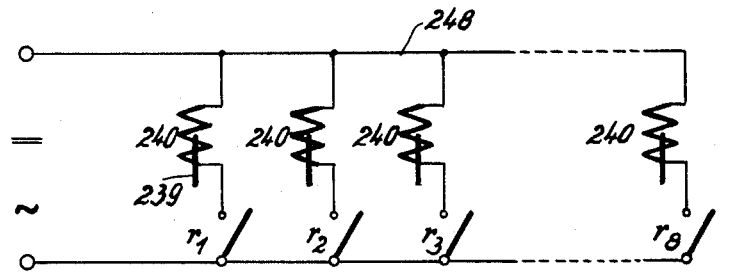
Figure 6:
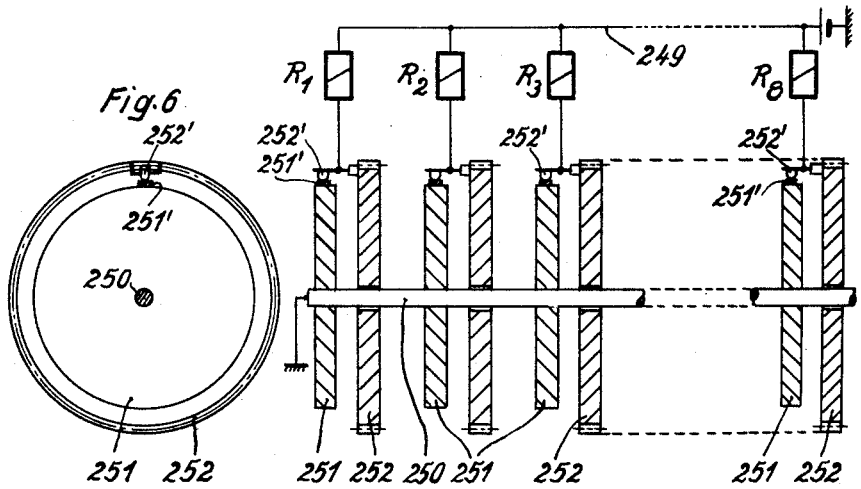

FIGS. 3 and 4 illustrate a device provided with eight setting pins, as seen respectively in the direction of the twist axis (FIG. 3) and from the side (FIG. 4); and FIGS. 5 and 6 show an example of an embodiment of a device for controlling the operation of the pull magnet for the pins indicated in FIGS. 3 and 4.

In accordance with the copending application, all even numbered conductors are within a crossing section intertwisted, in short spacing, with all odd numbered conductors of each layer, in such a manner, that the relative positions of the respective even numbered conductors and odd numbered conductors, among themselves, is retained, and that the odd numbered conductors are at each crossing point by a given peripheral angle displaced with respect to the even numbered conductors, the relative direction of motion or twist direction of the even and odd-numbered conductors being after a displacement, for example, of 180°, reversed.

Figure 1:
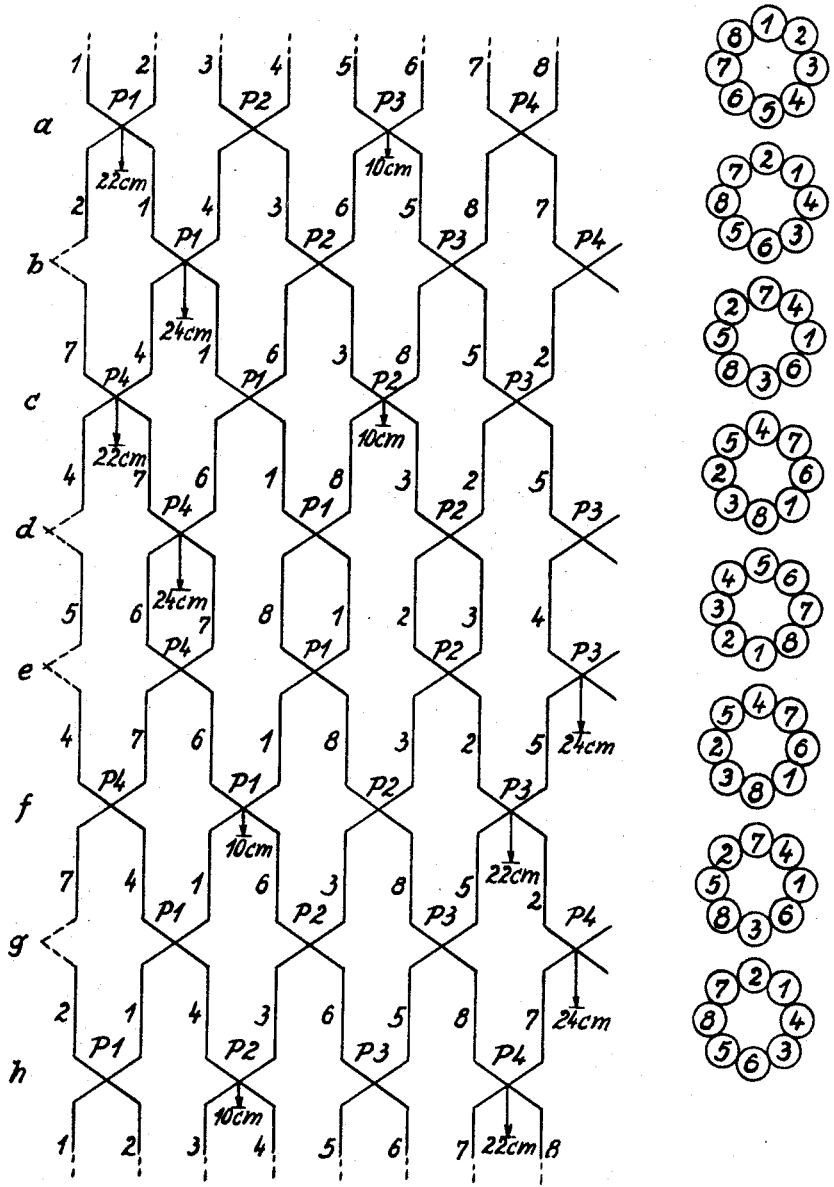
FIG. 1 shows in its left portion a crossing plan and in its right portion the positions of the respective individual conductors.

FIG. 1 shows in its left portion the crossing plan resulting from the above indicated intertwisting of the individual conductors, and in the right portion the respective positions of the individual conductors 1 to 8 between the crossing point rows which are indicated by $a$, $b$, $c$, $d$, $e$, $f$, $g$ and $h$. From the eight individual conductors may be formed the following line circuits and transmission circuits, respectively:

Side line $I_1$ from the conductors 1 and 5
Side line $I_2$ from the conductors 3 and 7
Side line $II_1$ from the conductors 2 and 6
Side line $II_2$ from the conductors 4 and 8
Phantom circuit I from conductors 1/5 and 3/7
Phantom circuit II from conductors 2/6 and 4/8.

Upon forming these four side lines and two phantom circuits, there will be fifteen coupling combinations possible between the six speech circuits, namely, the following combinations:

Side line $I_1$/Base $I_2$ "$I_1/I_2$"
Side line $I_1$/Phantom I "$I_1/I$"
Side line $I_2$/Phantom I "$I_2/I$"
Side line $II_1$/Base $II_2$ "$II_1/II_2$"
Side line $II_1$/Phantom II "$II_1/II$"
Side line $II_2$/Phantom "$II_2/II$"
Phantom I/Phantom II "I/II"
Side line $I_1$/Phantom II "$I_1/II$"
Side line $I_2$/Phantom II "$I_2/I$"
Side line $II_1$/Phantom I "$II_1/I$"
Side line $II_2$/Phantom I "$II_2/I$"
Side line $I_1$/Base $II_1$ "$I_1/II_1$"
Side line $I_1$/Base $II_2$ "$I_1/II_2$"
Side line $I_2$/Base $II_1$ "$I_2/II_1$"
Side line $I_2$/Base $II_2$ "$I_2/II_2$"

Further six coupling combinations would result upon additionally forming the possible third phantom circuits from the conductors 1 and 3, 5 and 7 as well as 2 and 4, 6 and 8.

FIG. 2 shows a decoupling plan for all coupling possibilities that may occur within an eight conductor stranded length. In the first column are entered the speech circuit combinations K$b$; in the second column are entered the coupling measurement values M; and in the third column is entered the factor F with which the respective measured coupling value is to be multiplied. This factor considers the coupling content which is effective with identical displacement amount. The values resulting therefrom are entered in the vacant fields of the eight columns for the crossing rows or series $a \ldots h$. Each of these eight columns is subdivided into two further columns, that is, at the crossing points $P_1 \ldots P_4$ which are to be considered and which are additionally marked by the two crossed conductors, for example, conductors 1 and 2 at the crossing point $P_1$ of the crossing row $a$.

It shall be assumed, for more particularly explaining the decoupling plan, that coupling had been measured respectively between the side line $I_2$ and the phantom circuit I, amounting to +90 pf., between the phantom circuits I and II amounting to −40 pf., and between the side line $I_2$ and the phantom circuit II amounting to +30 pf. Upon multiplying these measured values with the factor 1 or 2 respectively noted in the third column, there will be obtained the values appearing in the columns $a \ldots h$. The sum S is thereupon formed from the values appearing in the respective columns and this sum is entered in the penultimate horizontal row of the plan.

If it is assumed that the displacement of a crossing point by 0.1 centimeter results, for example, in a coupling amounting to 1 pf., there will be obtained, in centimeters, the amounts of displacement V, noted in the last horizontal row. The displacements resulting in the assumed example are for better understanding indicated in FIG. 1 by arrows extending from the involved crossing points, giving also the amounts of the respective displacement. Couplings measured between the transmission circuits are in this manner eliminated, thus obviating in given conditions the necessity to carry out compensation measures subsequently during the laying out of the fabricated cable lengths.

For carrying out the measurements, the conductors of the eight conductor stranded length are placed on an automatically operating measuring- and evaluating device, and the fifteen possible couplings are successively automatically measured. The values which are multiplied with the factor F of the third column (FIG. 2) can be stored in storers, known per se, which are cooperatively disposed with respect to the involved crossing points. Each of the sixteen storers forms automatically the sum upon completing the last measurement and the corresponding storing operations. The individual sums constitute measures for the required displacement of each crossing point from its normal position. Upon completion of the measuring and determination of the displacement program, the required displacement at the crossing points can be carried out by hand.

However, it is also possible to measure the couplings automatically, in given intervals, during the stranding and crossing of the conductors, to ascertain the required displacement of the crossing points automatically, and to displace automatically the crossing points by the ascertained amounts with respect to the position thereof appearing on the crossing scheme.

The ascertained displacement of given crossing points can be carried out manually with the aid of a simple tool, for example, with the aid of a pin made of metal or structurally firm synthetic material and provided with a handle. The displacement of the crossing points is facilitated since the conductors are positioned in a single layer and readily accessible. The conductors which contain the displacement point are advantageously lifted somewhat outwardly. The crossing point is thereupon longitudinally displaced by the ascertained amount, with the aid of the tool.

For the automatic displacement of the crossing points in the crossing device of the cable forming machine, during the stranding and crossing of the conductors, there may be used a device disposed directly ahead of the stranding point or station of the conductors, such device comprising a plurality of individually independently displaceable setting pins arranged radially to the stranding axis, the number of such pins corresponding to the number of conductors. The inner ends of these pins are adapted to enter between the conductors which are crossed within the crossing device, and can be retracted from the respective entry position at any desired instant, that is, individually at an instant which corresponds to the ascertained displacement amount. This may be advantageously effected by means of electromagnets which are respectively cooperatively related to the individual setting pins, such electromagnets (pull magnets) being individually independently operable. Special setting members are for this purpose operatively related to the individual pull magnets, whereby these magnets can be individually actuated with the aid of relays and switches. An example of an embodiment of this kind is illustrated in FIGS. 3 to 6.

FIG. 3 shows in part cross-sectional view a device equipped with eight setting pins, as seen in the direction of the twisting axis, and FIG. 4 shows in part cross-sectional representation a side view thereof. The device comprises an annular body 238 disposed upon a mounting plate 237, said annular body containing the eight radially directed setting pins 239. A pull magnet 240 is cooperatively related to each of the eight setting pins, the respective pull magnets being disposed each upon an angular bracket 241 fastened to the mounting plate 237. The radially outwardly directed portion of each individual setting pin is journalled within the cylindrical space such as 242 of its cooperatively related pull magnet, its radially inwardly directed end being adapted to enter between the conductors 1 to 8 which are being stranded about the core 243. The central portion of each setting pin is journalled within a radial bore 244 of the annular member 238. Each radial bore 244 contains a helical compression spring 245 which is by a tubular screw 247 compressed against a washer 246 which is fastened to the respective setting pin. The force exerted by the spring 245 presses the setting pin radially inwardly and holds the respective setting pin between two of the conductors.

Whenever neighboring or adjacent conductors are to be simultaneously crossed according to the crossing plan, all pull magnets will be energized for the purpose of outwardly withdrawing all setting pins from the position thereof relative to the conductors. However, upon ascertaining, by the coupling measurements, that a crossing point, for example, the crossing point between the conductors 1 and 8 is to be longitudinally shifted, the setting pin entered between the conductors 1 and 8 will be withdrawn with delay, responsive to delayed actuation of the pull magnet cooperatively related to the respective setting pin, that is, it will be withdrawn only upon the completion of the ascertained displacement, thus achieving the longitudinal displacement of the crossing point between the conductors 1 and 8.

FIGS. 5 and 6 show an example of an embodiment of a device for actuating the pull magnets 240. All pull magnets are connected in parallel relation in the circuit 248 and are individually actuated over cooperatively disposed contacts $r_1$ to $r_8$ which are respectively controlled by the parallel connected relays $R_1$ to $R_8$. As shown in FIG. 6, the required switching operations are controlled by contact disks 251 which are keyed to a common shaft 250, and by toothed wheels 252 (setting wheels) which are angularly adjustable on the shaft. The respective contact disks 251 are peripherally provided each with a contact 251' and each setting wheel 252 is provided with a contact brush 252'. The speed of revolution of the shaft 250 is by means of a suitable transmission gear so adjusted that the stranding machine draws the length of a crossing section with each revolution of the contact disks 251. Upon carrying out the crossings in normal crossing sections, the stationary setting wheels 252 are with their contact brushes 252' so adjusted that all contacts are after each revolution of the contact disks 251 simultaneously closed, thus effecting simultaneous actuation of the relays $R_1$ to $R_8$ and consequently simultaneous operative actuation of all pull magnets in circuits extending over the respective contacts or switches $r_1$ to $r_8$ which are controlled by the relays. In the event that individual crossing points are to be displaced by given amounts ascertained from the measured couplings, the setting wheels 252 are rotated by angular amounts corresponding to the required displacement, so that the contacts 251', 252' are closed at different times, that is, always at instants when the cable in the machine has been advanced by ascertained amount of displacement. All setting wheels 252 are restored to normal position responsive to the release of the pull magnets.

The invention is not inherently limited to the details of the explained and illustrated embodiment. For example, the circuits for the actuation of the pull magnets may be controlled electronically by substituting a light source and photocell for the contacts 251' and contact brushes 252'.

Changes may be made within the scope and spirit of the appended claims which define what is believed to be new and desired to have protected by Letters Patent.

We claim:

A communication cable comprising at least one layer of stranded insulated conductors, said stranded layer having an even number of conductors which are in such layer, in peripheral direction, successively disposed and consecutively numbered, whereby an even numbered conductor is always positioned adjacent to an odd numbered conductor, a two-conductor line being formed from respective pairs selected from the even numbered conductors and the odd numbered conductors of said stranded layer, said stranded layer being throughout its length subdivided into crossing sections, the lengths of which are short as compared with the fabrication length of the layer, there being within a crossing section, lengthwise thereof, a plurality of spaced apart conductor crossing points which are located in crossing point rows, an even numbered conductor being at such crossing point crossed with an adjacently positioned odd numbered conductor, the even numbered conductors, which retain their relative mutual positions within a crossing section, being transposed in one peripheral direction and the odd numbered conductors, which retain their mutual relative positions within a crossing section, being transposed in the other peripheral direction, the number of crossing point rows within a crossing section being such that the conductors appear, at the beginning and at the end of each crossing section, in the identical numerical sequence, selected ones of the individual crossing points being displaced lengthwise of the cable by a predetermined amount with respect to the other crossing points of the same crossing point row, the distance of said displacements being such that capacitive couplings are removed between said two-conductor lines, a two-conductor line and a phantom circuit formed from two conductor lines or between two phantom circuits.

References Cited by the Examiner

UNITED STATES PATENTS

| | | | |
|---|---|---|---|
| 478,367 | 7/92 | Sawyer | 174—34 |
| 2,882,677 | 4/59 | Davey | 57—156 |
| 2,944,380 | 7/60 | Klapper et al. | 57—34 |
| 2,956,102 | 10/60 | Lilly | 174—34 |
| 2,990,672 | 7/61 | Demmel | |
| 3,017,450 | 1/62 | Crosby et al. | 174—34 |
| 3,019,593 | 22/62 | Reid | 57—156 |
| 3,052,079 | 9/62 | Henning | 57—34 |

FOREIGN PATENTS 1,234,874  5/60  France.

DARRELL L. CLAY, *Primary Examiner.*

E. JAMES SAX, JOHN P. WILDMAN, *Examiners.*